(12) United States Patent
Gorshe

(10) Patent No.: US 6,513,092 B1
(45) Date of Patent: Jan. 28, 2003

(54) 1:N PROTECTION SWITCHING ARCHITECTURE FOR COMMON PROCESSING UNITS

(75) Inventor: Steven Scott Gorshe, Beaverton, OR (US)

(73) Assignee: Nec Eluminant Technologies, Inc., Herndon, VA (US)

( * ) Notice: Subject to any disclaimer, the term of this patent is extended or adjusted under 35 U.S.C. 154(b) by 0 days.

(21) Appl. No.: 09/552,430

(22) Filed: Apr. 18, 2000

(51) Int. Cl.$^7$ .............................. G06F 15/16; H04L 1/22; H04L 12/00; H04L 12/56; H02H 3/05
(52) U.S. Cl. .............................. 710/316; 714/4; 714/10; 370/218; 370/360
(58) Field of Search ................................. 710/305, 316; 714/2–4, 10, 11, 13; 370/218, 352, 360; 379/279; 709/250, 252, 253; 359/117; 340/2.1

(56) References Cited

U.S. PATENT DOCUMENTS

| | | | |
|---|---|---|---|
| 4,477,895 A | | 10/1984 | Casper et al. |
| 5,327,275 A | | 7/1994 | Yamane et al. |
| 5,408,462 A | | 4/1995 | Opoczynski |
| 5,497,374 A | * | 3/1996 | Maruyama et al. |
| 5,519,830 A | | 5/1996 | Opoczynski |
| 5,623,532 A | | 4/1997 | Houde et al. |
| 5,731,887 A | | 3/1998 | Fee |
| 5,809,027 A | * | 9/1998 | Kim et al. |
| 5,870,667 A | | 2/1999 | Globuschutz |
| 5,995,256 A | | 11/1999 | Fee |
| 6,016,219 A | | 1/2000 | Fatehi et al. |
| 6,229,822 B1 | * | 5/2001 | Chow et al. |
| 6,359,858 B1 | * | 3/2002 | Smith et al. |
| 6,397,345 B1 | * | 5/2002 | Edmonds et al. |

* cited by examiner

*Primary Examiner*—Gopal C. Ray
(74) *Attorney, Agent, or Firm*—Scully, Scott, Murphy & Presser

(57) ABSTRACT

A system for providing 1:n protection for common processing units in a star bus architecture multiplexer or switching system and providing one redundant protection common processing unit to protect up to n working common processing units has a pair of first and second common processing slots (C) for common processing units, a plurality of tributary interface slots (T) for tributary interface units, and at least one universal slot (U) for accommodating either an additional common processing unit or a tributary interface unit. If the working on-line common processing unit of the dedicated pair fails, the protection common processing unit takes over for the failed common processing unit. If one of the additional common processing units fails, the dedicated protection common processing unit takes over, thereby providing 1:n protection regardless of where each common processing unit is located.

12 Claims, 2 Drawing Sheets

1:N PROTECTION SWITCHING ARCHITECTURE FOR COMMON PROCESSING UNITS

BACKGROUND OF THE INVENTION

1. Field of the Invention

The present invention relates generally to a 1:n protection switching architecture for common processing units wherein 1 common processing unit protects n working common processing units.

As data becomes increasingly packet-oriented, there is an increased requirement to process the PCM (Pulse Modulation Transfer Mode) payload data. Examples of this processing include ATM (Asynchronous Transfer Mode) adaptation, DS0 (Digital Signal Level 0) to IP (Internet Protocol) telephony, and IP over ATM. In each of these examples, it is most cost effective to be able to increase the number of common processing units based upon the number of tributary interface units (and their bandwidth). As a result, typically there will be more than one on-line common processing unit.

Star bus related architectures allow the highest internal system bandwidth, but make increasing the number of common processing units more difficult, and especially make 1:n protection of the common processing units more difficult. The present invention resolves both of these problems by allowing 1:n protection wherein additional common processing use slots capable of accommodating either common processing units or tributary interface units.

In typical telecommunications systems, common processing units are usually protected by a 1:1 protection scheme wherein each working processing unit has one protection processing unit. Some systems, however, have multiple working common processing units of the same type. For example, if the common processing units in a switch or multiplexer system process a portion of the system payload traffic, it is advantageous to have multiple working common processing units. This approach reduces the amount of circuitry on each of the common processing units in order to reduce the cost of low bandwidth applications (which are typical at initial deployment) while providing a modular approach to increase the processing capability by adding more common processing units as the payload bandwidth increases. For example, one more working common processing unit could be added for every 14 DS1 (Digital Signal Level 1) interfaces.

Common processing units which handle the PCM payload include higher-speed interfaces (with multiplexing capability) and payload data processing units which perform format conversions (e.g., TDM (Time Division Multiplexing) to ATM conversion or TDM to IP packet conversion) or switching/routing. These types of common processing units are typically connected to the tributary interface units by either a bus or star related arrangement. The present invention is particularly advantageous for star-related PCM architectures since these architectures allow a much higher system data throughput than shared bus architectures.

2. Discussion of the Prior Art

Systems wherein common processing units share common buses with tributary units instead of a star connection and various 1:1 protected systems are disclosed by U.S. Pat. Nos. 5,408,462; 5,623,532; 4,477,895 and 5,731,887.

SUMMARY OF THE INVENTION

Accordingly, it is a primary object of the present invention to provide a 1:n protection switching architecture for common processing units wherein 1 protection common processing unit protects n working common processing units.

Common processing units in multiplexer and switching systems typically have one dedicated protection (standby) common processing unit for each working common processing unit. In contrast thereto, the present invention provides a mechanism to allow a single protection common processing unit to provide protection for multiple working processor units. This type of protection is known as 1:n protection (i.e., 1 protection unit protects n working units). Common processing units can include payload data conversion units, high-speed interface units, or switch/routing units.

The present invention is particularly useful in systems wherein tributary interface units are connected to common processing units by a star related configuration in which the common processing unit (or unit pair) has a plurality of separate connections to the tributary interface units. The present invention allows common processing units to be located in either dedicated slots or in slots which can also be used by tributary interface units, while still providing 1:n protection regardless of where the common processing unit is located.

The present invention provides:

1) 1:n protection of common processing units (which are traditionally 1:1 protected);
2) a combined 1:1 and 1:n arrangement to allow additional, protected common processing units to be added to a star related architecture centered around another common processing unit;
3) 1:n protection for common processing units when there are more than two common processing units in a system, which lowers overall system costs;
4) a way to implement a star related connection architecture to common processor units while allowing the addition of more of that type of common processor unit to the legs of the star rather than at the center with protection, to increase system reliability.

The present invention provides:

(1) Lower initial system cost by allowing the number of common processing units to scale with system bandwidth and processing requirements,
(2) Lower overall system costs by allowing 1:n protection of common processing units rather than the traditional 1:1 protection, and
(3) Fast protection switching by a dedicated, high-speed download port from the system controller to the protection unit.

The present invention is ideally suited for a service access multiplexer or packet switch system or cell switch system which can perform protocol processing on payload data.

The present invention should greatly increase the marketability of service access multiplexer or packet or cell switch systems by allowing modular growth for low initial cost and by reducing the cost of a fully-loaded system by reducing the number of dedicated protection units.

The present invention allows modular growth of systems employing common processing units, which is especially important for systems handling packet or ATM data, and allows cost-effective 1:n protection of the common processing units with a star bus architecture providing a high internal system bandwidth.

BRIEF DESCRIPTION OF THE DRAWINGS

The foregoing objects and advantages of the present invention for a 1:n protection switching architecture for common processing units may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE INVENTION

Figure 1:
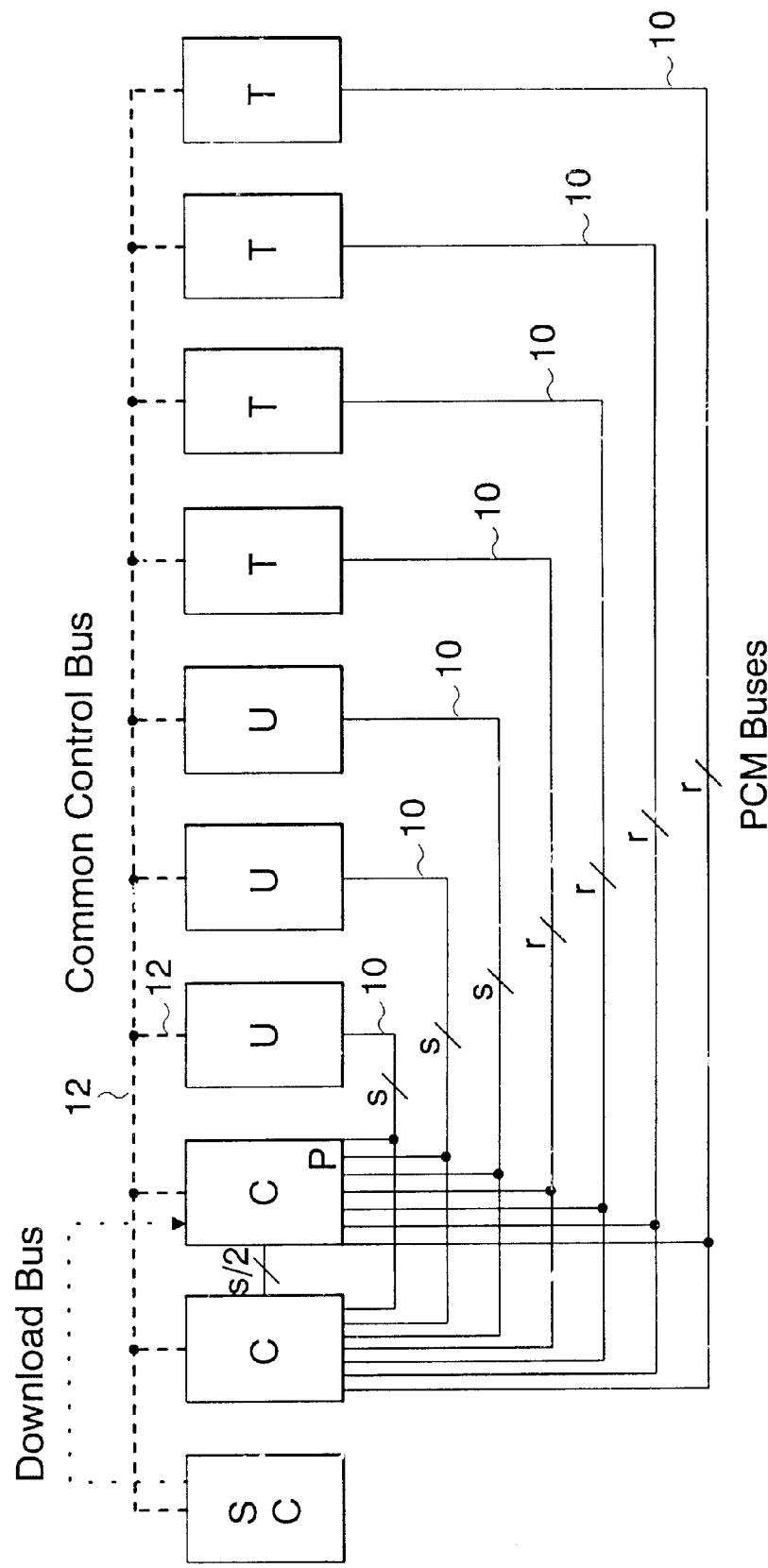
FIG. 1 illustrates a basic star-connected PCM architecture of a first embodiment of the present invention wherein slots which can accommodate only common processing units are designated as C (common processing unit), slots dedicated to only tributary interface units are designated as T (Tributary interface slots), and slots capable of accommodating either a common processing unit or a tributary interface) unit are designated as U (Universal) slots.

The present invention allows 1:n protection of common processing units in a multiplexer or switching system. Specifically, one redundant (protection) common processing unit is used to protect up to n working common processing units. While 1:n protection is common for tributary interface units, it is more difficult to implement for common processing units. Typically, all of the PCM data is sent to the common processing units. If all common processing units and tributary interface units share common PCM buses, it is relatively straightforward to provide 1:n protection since the common processing units all have the same PCM bus connectivity.

In higher bandwidth systems, however, it is necessary to have the tributary interface units connect to common processing units by a star related configuration rather than by a shared single bus. In a star configuration, a common processing unit (or unit pair) has a dedicated connection to each tributary interface unit. In a hybrid star configuration, a common processing unit (or unit pair) has a plurality of connections to the tributary interface units, with each connection being shared between two or more units. Increasing the number of common processing units either requires more units sharing a bus (which reduces the data rates feasible for that bus) or separate sets of star connections to the additional common units. Using separate sets of star connections adds signals to the tributary interface units and requires dedicated slots for the additional common processing units.

The present invention overcomes this restriction and allows at least a subset of the tributary interface unit slots to be used for either tributary interface units or for common processing units.

The present invention uses a pair of dedicated slots for common processing units, and the common processing units are at the hub of star related bus connections. One of the common processing units is designated as a protection unit, and only one of the two common processing units is on-line at any time. When additional common processing units are required, the on-line common processing unit in this dedicated pair routes the desired PCM data over its connection to the slot containing the additional common processing unit. (Again, this slot could optionally contain either a tributary interface unit or a common processing unit.)

In the event that the working unit of the dedicated pair of common processing units fails, the protection unit takes over, including all of the routing of data to the additional common processing units.

If one of the additional common processing units fails, again the protection unit of the dedicated pair takes over. Since the protection unit already has access to and sees all of the PCM data, it is able to receive directly all of the data it requires. The output data from the protection unit in this case can be sent to the online dedicated unit (the protection unit being online now in a limited sense) either by the same bus connections used by the failed unit or by a separate bus connection.

Since the amount of provisioning/configuration data required by a common processing unit can be substantial, a preferred implementation of the present invention includes a dedicated, high-speed download port from the system controller to the protection unit.

FIG. 1 illustrates the basic star-connected PCM architecture of a first embodiment of the present invention. In the first embodiment, two slots are dedicated to common processing units CPUs, one of which is dedicated as a protection slot P. To provide maximum system flexibility, additional common processing units CPUs should be able to use the same slots used by the tributary interface units TIUs. This slot compatibility allows choosing the appropriate ratio of common processing units CPUs to tributary interface units TIUs based upon the bandwidth of various tributary interface units and the complexity of processing that is desired for the PCM data. In FIG. 1, the slots which can accommodate only common processing units are designated as C (Common processing unit) slots. The slots in FIG. 1 dedicated to only tributary interface units are designed as T (Tributary interface) slots. The slots capable of accommodating either a common processing unit/or a tributary interface unit are designated as U (Universal) slots. In practice, it may be necessary to restrict the number of Universal slots. For example, it may be necessary to have more signals between the C slots and U slots so that the common processing units in the C slots can send a higher volume of PCM data to the common processing units in the U slots than it would need signals to send to tributary interface units in either the T or U slots.

All of the tributary interface units send their PCM data to and receive their PCM data from the working on-line common processing unit in one of the dedicated Common processing slots over PCM buses 10. Additionally, all of the processing units are also interconnected by a command control bus 12 for the transmission of control data and commands. When additional common processing units are required, they are placed in the Universal slots. The on-line common processing unit in a C slot is responsible for sending and receiving the PCM data to/from the common processing unit(s) in the U slot(s). In other words, the common processing unit in the common processing unit C slot relays data between the tributary interface units and the common processing unit(s) in the U slot(s).

A system control unit SC is responsible for providing and downloading the configuration information (provisioning) for each processing unit. For the common processing units, this provisioning includes the assignment of which PCM data it is to process and downloading the software required to perform this processing. For the common processing unit located in a C slot, the provisioning also indicates what PCM data needs to be routed to the additional processing units in the U slots.

The protection mechanism is actually a hybrid of 1:1 and 1:n protection. In all cases, one of the C slots is reserved for the protection processing unit. If only a single common processing unit is required, that working processing unit and its protection common processing unit reside in the two C slots. Here the protection is 1:1. Only the on-line processing unit in one of the two C slots actually places data onto the PCM buses. If the working processing unit is fully provisioned and has no failures, it is typically the on-line processing unit. In the event of a failure or removal of the working processing unit, the protection processing unit takes over as the on-line unit As stated above, the common processing units in the U slots receive all of their PCM data from the online processing unit in one of the C slots. If a common processing unit in one of the U slots fails, the protection processing unit in the C slot takes over the processing for that unit. Since the protection processing unit already sees (receives) all of the PCM data from the tributary processing units, there is no need to re-route this PCM data to the protection processing unit. Alternatively, the protection processing unit could receive the PCM data from the same PCM bus that was used by the failed processing unit. The processed PCM data can either be sent from the protection processing unit to the working processing unit in the C slot over a dedicated port, shown in FIG. 1 as a connection with s/2 signals, or over the same PCM connection that the failed processing unit used.

Since the protection processing unit can protect the working processing unit in the C slot or in one of the U slots, it is 1:n protection. The difference is that when the protection processing unit protects and takes over for the working processing unit in the C slot, it must take over the routing functions to exchange PCM data with the common processing units in the U slots.

In order to take over for the failed processing unit, the protection processing unit must receive all of the failed unit's provisioning information (as well as the U-slot routing information if the failed processing unit is in the other C slot). Since there can be a large amount of provisioning data associated with a common processing unit, it can take a long time to configure. For this reason, a preferred embodiment has a separate, high-speed communications port connected to a download bus 14 for quickly downloading the provisioning information to the protection processing unit.

Figure 2:
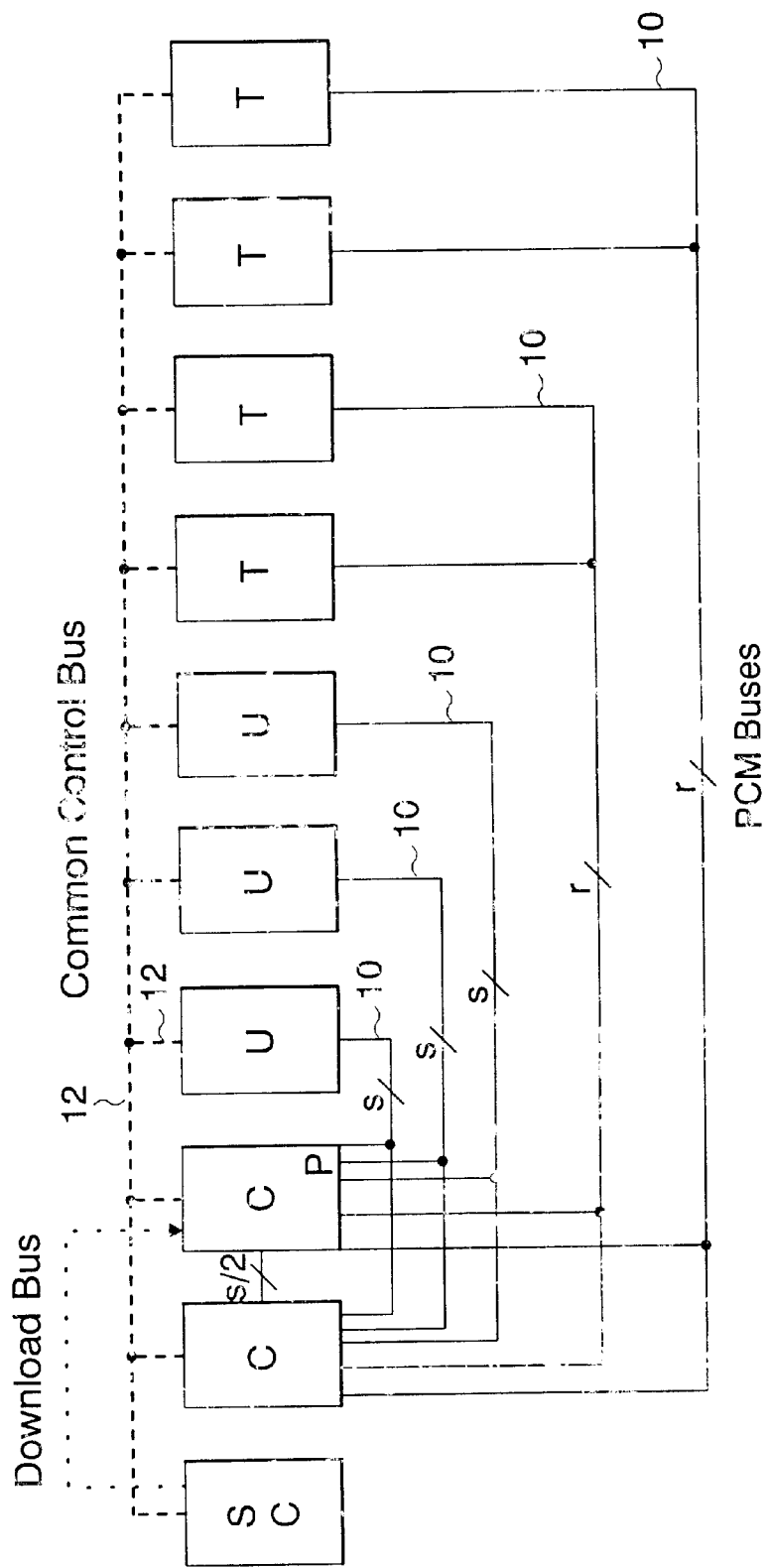
FIG. 2 illustrates a hybrid star-related, shared bus, PCM architecture of a second embodiment of the present invention which is similar to and includes the same designations as FIG. 1.

FIG. 2 illustrates a hybrid star-connected, shared bus, PCM architecture of a second embodiment of the present invention which is similar to and includes the same designations as FIG. 1. The difference is that instead of having a full star bus architecture having a separate PCM bus extending to each slot, FIG. 2 illustrates a hybrid star architecture. In the hybrid star architecture of FIG. 2, a plurality of PCM buses extend between the pair of dedicated common processing units and the universal slots and the tributary interface unit slots, and some of the PCM buses extend to and are shared by a plurality of units. The shared buses could be shared between universal slots or shared between tributary interface unit slots, and each bus could be shared between two slots, or three or more slots depending on the configuration of the hybrid star configuration.

While several embodiments and variations of the present invention for 1:n protection switching architecture for common processing units are described in detail herein, it should be apparent that the disclosure and teachings of the present invention will suggest many alternative designs to those skilled in the art.

What is claimed is:

1. A system for providing 1:n protection for common processing units in a multiplexer or switching system having a star bus related architecture and providing one redundant protection common processing unit to protect up to n working common processing units, n being a positive number, the system comprising:

a. a pair of first and second dedicated common processing slots (C) for common processing units which are at the hub of star related bus connections, wherein one of the common processing units is the redundant protection common processing unit, and only one of the first and second common processing units is normally online at any time;

b. a plurality of tributary interface slots (T) for accommodating a plurality of tributary interface units, wherein the pair of dedicated common processing units have a star related connection to each tributary interface unit;

c. at least one universal slot (U) for accommodating either an additional common processing unit or a tributary interface unit, wherein the on-line common processing unit of the dedicated pair routes pulse code modulation (PCM) data over its connection to the slot containing the additional common processing unit; and d. wherein in the event that
      (i) the working on-line common processing unit of the dedicated pair fails, the protection common processing unit takes over for the failed common processing unit, including all routing of data to additional common processing units; and
      (ii) if one of the additional common processing units fails, the dedicated protection common processing unit takes over for the failed common processing unit, whereby common processing units can be located in either dedicated slots or in slots which can also be used by tributary interface units, thereby providing 1:n protection regardless of where each common processing unit is located.

2. A system as claimed in claim 1, wherein a system control unit (SC) is responsible for providing and downloading configuration/provisioning data for each processing unit.

3. A system as claimed in claim 2, further including a dedicated, high-speed download port from the system control unit to the protection common processing unit, to carry a relatively larger amount of provisioning/configuration data required by the protection common processing unit.

4. A system as claimed in claim 3, wherein for the common processing units, the provisioning data includes an assignment of which PCM data it is to process and downloading software required to perform the processing, and for the common processing unit in the pair of dedicated slots, the provisioning data also indicates what PCM data is to be routed to additional common processing units in the universal slots.

5. A system as claimed in claim 1, wherein a common control bus extends between the system control unit, all common processing units and all tributary interface units.

6. A system as claimed in claim 1, wherein the star bus related architecture comprises a full star bus architecture wherein a separate PCM bus extends between the pair of dedicated common processing units and each of the universal slots and each of the tributary interface unit slots.

7. A system as claimed in claim 1, wherein the star bus related architecture comprises a hybrid star bus architecture wherein a plurality of PCM buses extend between the pair of dedicated common processing units and the universal slots and the tributary interface unit slots, and some of the PCM buses extend to and are shared by a plurality of units in either the T slots or the U slots.

8. A system as claimed in claim 1, wherein the protection processing unit receives PCM data from the same PCM bus that was used by the failed processing unit.

9. A system as claimed in claim 1, wherein processed PMC data is sent from the protection processing unit to the working processing unit in the C slot over a dedicated port.

10. A system as claimed in claim 1, wherein the system comprises a service access multiplexer which performs protocol processing on payload data.

11. A system as claimed in claim 1, wherein the system comprises a packet switch system which performs protocol processing on payload data.

12. A system as claimed in claim 1, wherein the system comprises a cell switch system which performs protocol processing on payload data.

* * * * *